Patented Jan. 1, 1929.

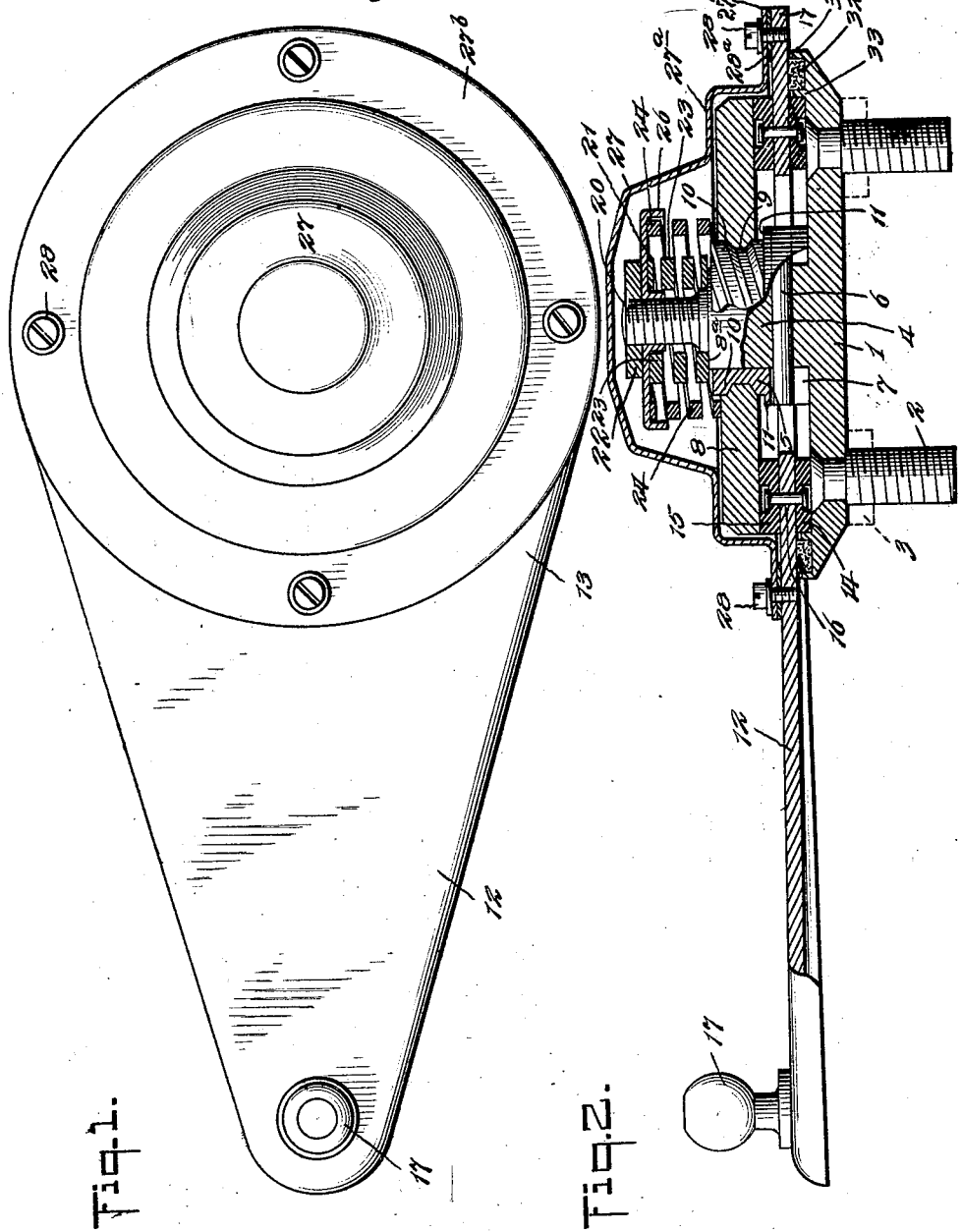

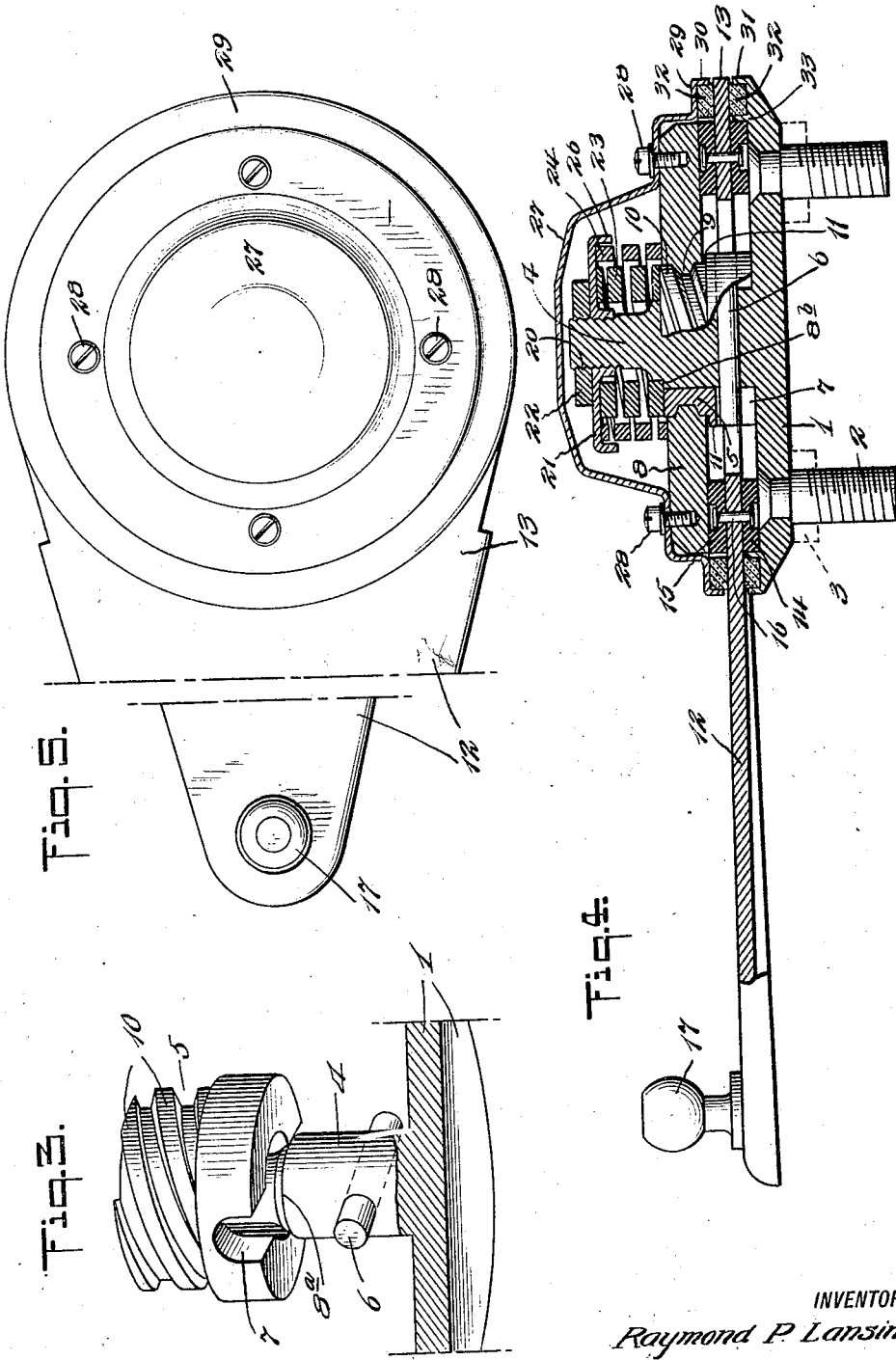

1,697,392

UNITED STATES PATENT OFFICE.

RAYMOND P. LANSING, OF MONTCLAIR, NEW JERSEY.

SHOCK ABSORBER FOR VEHICLES.

Application filed May 15, 1924, Serial No. 713,532. Renewed November 18, 1926.

My invention relates to shock absorbers, or appliances for controlling the action of vehicle springs.

A principal object of the invention is to provide a simple, strong and durable appliance of the friction type which applies a predetermined maximum frictional resistance to the vehicle spring action in one direction of movement, this maximum resistance being applied very quickly after the beginning of the stated movement, and continuing to the end of the movement, the resistance to vehicle spring movement in the other direction usually being materially less and in some cases relatively very small. A further object is to provide a limited degree of substantially free movement.

Briefly described, and for convenience and without intention of limitation referring to the representative embodiment of my invention as herein shown, the appliance comprises a main friction member or plate adapted to be connected to one part of a vehicle such as the chassis frame, an arm or lever member arranged for relative movement and adapted to be connected to another vehicle part such as an axle, another friction member or plate arranged to frictionally engage the lever and to urge the latter into frictional engagement with the first named plate, a member arranged to move slightly along the axis of rotation of the appliance and restrained from rotative movement, the last named friction plate and said member having cooperative diagonal surfaces or screw threads, a main pressure spring arranged to exert a predetermined pressure on the friction surfaces in one direction of movement and also arranged so that its thrust is substantially self-contained and ineffective in the other direction of movement, another spring which may be called a controlling or actuating spring, and other features referred to hereafter.

The appliance is in general similar to a prior application of Harold D. Church, Serial No. 619,159, filed February 15th, 1923, but the mechanical embodiment of the present invention is in many respects different, the structure being in certain respects simplified and improved both structurally and functionally, and especially certain parts such as the spring and the co-operative inclined members are simplified in their relative arrangement and are made more accessible. The present device is also especially designed for economical manufacture.

The characteristics and advantages of the invention are further sufficiently explained in connection with the following detail description of the accompanying drawings which show certain representative embodiments of the invention. After considering these, persons skilled in the art will understand that many variations may be made within the scope of the invention, and I contemplate the employment of any structures which are properly within the scope of the appended claims.

Fig. 1 is a side elevation of an appliance embodying the invention in one form.

Fig. 2 is a longitudinal horizontal section.

Fig. 3 is a perspective view of the main plate and spindle, with the nut or shifter in partly removed position, and with other parts omitted.

Fig. 4 is a horizontal section of a slightly modified form of the device.

Fig. 5 is a condensed front elevation of the same.

Referring first to the representative form of the invention as shown in Figs. 1, 2 and 3, this form being preferred in some cases, the appliance is built upon and around a base or main friction plate 1 which is provided with screw studs 2 for connection to a motor vehicle chassis frame member. Spacers 3 indicated in dotted lines may be placed between plate 1 and the frame, and if desired bolts may be substituted for the screw studs. Plate 1 has at its center a spindle 4 which may be integral with the plate as shown, or separate and secured thereto. A sleevelike member 5 which may be referred to as a nut or otherwise as a shifter, is arranged to move axially on the spindle and is prevented from rotating by any suitable means such as the pin 6 passing through the spindle and engaging longitudinal sockets 7 in the shifter. A friction plate 8 is operatively connected with the shifter by screw threads 9 and 10, the pitch of which may, in a representative case, be about, or exactly 20°. The shifter has an annular shoulder 11 confronting the inner face of plate 8 to limit the relative movement of the shifter in one direction. A definite clearance is provided between shoulder 11 and the inner plate surface, mainly to insure that the plate may be brought into active frictional contact with co-operating friction members hereafter mentioned, and to allow for wear of such friction members or surfaces. This clearance may amount to only a small fraction of an inch and is somewhat exaggerated in the drawing, for the sake of illustrative clearness.

An arm or lever member 12 is provided with a flat hub portion 13 having a large central aperture surrounding shifter 5 and spindle 4. The lever, or more particularly its hub portion 13, constitutes a friction member located between the friction plates 1 and 8 and movable in relation to plate 1. Usually flat annular friction disks or rings 14 and 15 are placed between plate 1 and the lever portion 13, and plate 8 and lever portion 13 respectively, and in some cases these friction rings may be loose or otherwise they may be connected to the friction member 13 by countersunk rivets 16. The lever 12 is arranged for connection to the vehicle axles in any suitable way, for instance by a ball-end fitting 17, link and suitable fitting secured to the axle.

A screw thread 20 is formed on the outer end of spindle 4. A washer or nut 21 has adjustable engagement with the screw thread and is secured in adjusted position by a lock nut 22. The nut or washer 21 serves as a spring abutment, and a main or pressure spring 23 is compressed between this abutment and a shoulder 8ª formed on the spindle, this shoulder being so positioned with relation to the outer end of nut 5 that there is a substantial clearance between the nut end and the adjacent face of the spring which projects outwardly all around the shoulder 8ª. This clearance, which may be omitted in some cases, but in a preferred construction is desirable for reasons explained below, may be only a small fraction of an inch, and is somewhat exaggerated in the drawing, for the sake of illustrative clearness. Another spring 24, usually smaller and "weaker" than the pressure spring, is compressed between the abutment 21 and the outer face of plate 8 and centered by flange 26 at the periphery of the abutment. This second spring may be referred to as a controlling or actuating spring in distinction from the other, which supplies the principal friction effect.

A housing or cover may be provided in the shape of a pressed sheet metal cap 27, suitably formed to enclose the springs, plate 8, and friction ring 15. When this cap or housing is formed with a flat annular portion 27ª close to the outer face of plate 8, a definite clearance is provided between the inner face of this housing portion and the plate, to avoid any interference with slight outward movement of the plate. The housing has a flange 27ᵇ secured to plate 13 by screws 28, and a gasket 28ª is desirably provided to insure a water, grease, and dirt-proof connection.

A flange 31 is provided on base plate 1, which serves to locate and hold in compression against plate 13, an annular packing ring 32 of any suitable material, such as felt, to exclude moisture and dirt or retain lubricant.

The plate 13 may be properly located or centered for oscillating movement in any convenient way. Specifically, in the present example, an annular flange 33 is formed on base plate 1, within which the periphery of friction ring 14 is located with an ordinary bearing fit, so that the ring and the plate to which it is attached, are properly centered about the spindle.

The appliance may be so arranged on the vehicle that the maximum friction resistance is opposed to either vehicle spring compression or recoil. If the screw threads on nut or shifter 5 have a right hand lead the maximum resistance or effect of spring 23 will be applied to right hand or clockwise movement of lever 12 in the following way:

When the lever moves in the stated direction, for a fairly short angular movement the friction resistance to sliding movement of ring 14 on plate 1 is only that provided by spring 24 acting through plate 8. During this small angular movement plate 8 moves along with the lever by frictional contact with ring 15. This small angle of relatively free movement permits the vehicle spring to act in an entirely or approximately normal way as the road wheel passes over small irregularities. Further movement of lever 12 in the same direction causes any clearance between threads 9 and 10 to be taken up. Further slight angular movement of plate 8 along with the lever then causes the screw thread 9 acting on thread 10 of the shifter to raise the latter slightly. This shifter movement is produced by the non-rotative connection of the shifter to the spindle. The clearances between flange 11 and plate 8, and between the outer end of the nut and the end spring 23, are usually proportioned approximately as indicated in the drawing, so that the outer end of the nut strikes the inner end of spring 23 before shoulder 11 encounters plate 8. As soon as the nut engages the spring, the further rotative movement of plate 8 causes the heavy spring 23 to be lifted from its seat on spindle shoulder 8ª and the full force of the spring is thus applied through the nut and plate 8 to the friction surfaces, although relative movement is at this moment only occurring at one surface, namely, the surface of contact between ring 14 and plate 1. It will now be understood that the total clearance between flange or shoulder 11 and plate 8 must be sufficient to provide an appreciable rotative travel of plate 8 after the outer end of the nut encounters the spring, in order that the spring may be definitely moved or "lifted" from its seat to apply the full pressure effect to the friction surfaces. Such rotative movement continues therefore, until the shoulder 11 engages plate 8, and thereupon further rotation of the plate is prevented and frictional slippage occurs at both of the friction surfaces, that is, the one previously in action and the surface of engagement between ring 15 and plate 8. This frictional slippage or resistance is the maximum for which the appliance is designed and adjusted, and is due to the sum of the pressures of both of the springs 23 and 24. The whole range of movement of arm 12 from a substantially neutral position, as assumed at the beginning of this operative description, to the point where the inner end of the main spring is definitely lifted from its seat, may be conveniently referred to as the windup period or portion of the total arm movement in one direction, this being the direction in which maximum friction retardation is applied.

In a more limited way the actual windup or act of compression of the main spring 23 may be considered as limited to the part of the total windup movement, which occurs from the instant when the outer end of the nut encounters the spring, to that instant when the spring end is definitely lifted from its seat. The total windup period or angle of movement may correspond in a particular case to only about one inch of travel of ball 17. In the first part of this movement, resistance to movement of the vehicle axle in relation to the main frame is relatively small or practically negligible, because friction resistance occurs only at one surface and is caused only by the pressure of the light spring 24. The friction resistance increases considerably near the end of the windup period by reason of the pressure created by the work done in lifting the spring end from its seat, but this is effective only at one friction surface until rotation of plate 8 is stopped by engagement of flange 11 with the plate. The windup period or range of movement of arm 12 then terminates and slippage with full friction resistance occurs at both friction surfaces, and this resistance to movement of the vehicle axle in relation to the main frame continues at the maximum value during the remainder of the stated movement of arm 12, which may be in some cases approximately 5 or 6 inches, or when the appliance is used at the front axle, say about 4 inches.

When, at the end of one considerable arm movement as just described, the arm commences to move in the reverse direction, a considerable resistance is opposed to the initial part of such movement, or until the screw threads of plate 8 commence to slide on the nut threads 10. This thread sliding or slipping commences, of course, almost immediately upon the movement of arm 12 in the stated direction. As soon as plate 8 definitely commences to move along with the arm, the friction resistance to arm movement occurs only at the surface of contact between ring 14 and plate 1, this friction, however, being quite considerable and being due to the full pressure effect of both of the springs. As soon as plate 8 moves through a small circular angle, the consequent inward travel of nut 5 permits the inward end of spring 23 to encounter its seat on shoulder 8ª. From that instant, the further travel of arm 12 in the stated direction is resisted only by friction at the one surface, caused by the pressure of light spring 24. The friction resistance to the principal range of arm movement in the stated or reverse direction is therefore, materially smaller than that opposed to the major part of the arm movement first described. When the vehicle is running on comparatively smooth roads and the axle therefore moves only moderately in relation to the vehicle frame, the total movement at the end of arm 12 is small and is within the range of approximately free action of the appliance which therefore, opposite only a moderate or in some cases negligible resistance to such slight movement or jiggling of the axle, or otherwise stated, the normal free action of the vehicle springs is not materially affected under such conditions; but immediately upon encountering any considerable road surface variation, the greater ensuing range of movement of arm 12 beyond the approximately free range will produce, in the manner above described, the maximum frictional resistance throughout the major part of such movement in one direction, and a smaller but constant resistance throughout the major part of the movement in the other direction.

It will be evident to persons skilled in the art, without elaborate explanation, that the appliance may be arranged or connected so as to apply the maximum resistance to either vehicle spring compression or recoil. Since violent spring recoil is usually the most objectionable feature of vehicle spring action, the appliance will usually be arranged to oppose the maximum resistance to such recoil movement.

The effective pressure of the springs and especially of spring 23 may be regulated to a great extent by adjustment of the abutment nut 21, and of course springs of different cross section and thrust effect may be provided as may be necessary or desirable.

The pitch of the screw threads 9 and 10 is sufficiently coarse to prevent any lock action, and aside from that condition the pitch may be varied considerably. In one particular design the thread pitch-angle may be 20°, as stated above. The nature of the device is such that minor irregularities in the screw thread surfaces with any reasonable thread pitch do not appreciably affect the action.

Figures 4 and 5 illustrate a modification which consists largely in a simplification of the previously described structure by elimination of the clearance between the end of nut 5, and the inner end of spring 23. In this arrangement spindle shoulder $8^b$ is practically flush with the outer end of the nut when the nut is in its inward position with the ends of lugs 7 seated against plate 1. Of course, the shoulder $8^b$ might be cut still farther back so that the spring in this condition definitely seats against the end of the nut. A clearance is provided between flange or shoulder 11 and plate 8, as in the previous instance, and this provides for a small, though substantial rotative movement of plate 8 when arm 12 moves right-handed, while the nut is moved outward against the pressure of spring 23 and until plate movement ceases by engagement of shoulder 11 with it. The operation of this modified structure will be sufficiently understood from the preceding explanation, the principal difference being that in the windup movement above referred to, spring 23 commences to exert its full force, effective at the surface of contact between ring 14 and plate 1, substantially as soon as thread clearance is taken up. The present modified form of the device therefore, provides usually a small range of relatively free movement or a smaller relatively free part of the total windup movement.

Another modification consists in securing the housing 27 to plate 8 by means of screws 28. In this arrangement the housing moves with plate 8 and at times therefore has movement relative to plate 13. To provide a dirt, grease, and waterproof seal therefore, a compressible packing ring 32 of felt or other suitable material is placed under compression between a flat annular portion 29 of the housing, and the outer surface of plate 13, and is retained in proper position by a shallow cylindrical flange 30, formed at the inner portion of the housing.

I claim:

1. A vehicle shock absorber or spring retarder, comprising a first friction member, a spindle member thereon, a shifter arranged for axial and non-rotative movement on the spindle member, a second friction member having an inclined surface cooperating with a complemental surface of the shifter, a third friction member arranged for rotative movement between the first and second friction members, a spring abutment secured to the spindle member, a pressure spring located between the abutment and the outer end of the shifter, and a controlling spring acting on said second friction member, the construction and arrangement being such that in one direction of movement of said third friction member the thrust of the pressure spring is self-contained and ineffective, and in the other direction of movement the full pressure effect of the spring is exerted to apply frictional resistance to movement of said third friction member.

2. A vehicle shock absorber or spring retarder, comprising a friction plate, a spindle member thereon, a shifter arranged for axial and non-rotative movement on the spindle member, a second friction plate having an inclined surface cooperating with a complemental surface of the shifter, the shifter having means for engaging said second friction plate after slight movement of the latter in one direction to prevent further plate movement, a third friction plate arranged for rotative movement between the first and second friction plates, a spring abutment secured to the spindle member, a pressure spring located between the abutment and the outer end of the shifter, and a controlling spring acting on said second friction plate, the construction and arrangement being such that in one direction of movement of said third friction plate the thrust of the pressure spring is self-contained and ineffective, and in the other direction of movement the full pressure effect of the spring is exerted to apply frictional resistance to movement of said third friction plate.

3. A shock absorber or spring retarder for vehicles, comprising a main plate, a spindle thereon, a shifter mounted for axial non-rotative movement on the spindle, a second friction plate having threaded engagement with the shifter, a pressure spring, a third friction member provided with friction rings located between the first and second plates, and means on one of said plates engaging the periphery of one of the friction rings and locating the third friction member for rotative movement.

4. A shock absorber or spring retarder for vehicles, comprising a main plate, a spindle thereon, a shifter mounted for axial non-rotative movement on the spindle member, a second friction plate having threaded engagement with the shifter, a pressure spring, a third friction member apertured to accommodate the spindle and shifter, provided with friction rings and located between the first and second plates, and a flange on one of said plates engaging the periphery of one of the friction rings and locating the third friction member for rotative movement.

5. A shock absorber or spring retarder for vehicles, comprising a main plate arranged to be secured to a vehicle frame member and also having a central spindle member, a shifter located on the spindle member, means connected with the spindle member and engaging the shifter to prevent rotation and permit axial movement of the latter, a movable friction plate having screw-thread engagement with the shifter, a lever having an annular portion located between the main plate and the movable plate and provided with friction rings, a spindle extension, a spring abutment having screw-thread engagement with said extension, a main spring located between the abutment and the outer end of the shifter, and an actuating spring located between the abutment and the movable friction plate.

6. A shock absorber or spring retarder for vehicles, comprising a main plate arranged to be secured to a vehicle frame member and also having a central spindle member, a shifter located on the spindle member, means connected with the spindle member and engaging the shifter to prevent rotation and permit axial movement of the latter, a movable friction plate having screw-thread engagement with the shifter, a lever having an annular portion located between the main plate and the movable plate and provided with friction rings, a spindle extension, a spring abutment having screw-thread engagement with said extension, a main spring located between the abutment and the outer end of the shifter, and an actuating spring located between the abutment and the movable friction plate, the shifter being provided with a shoulder to engage the movable friction plate and normally having a slight clearance therefrom.

7. A shock absorber or spring retarder for vehicles, comprising a main plate having means for securing it to a vehicle frame member and also having a central spindle member, a shifter located on the spindle member, a pin passing through the spindle member and engaging in slots in the shifter to prevent rotation and permit axial movement of the latter, a movable friction plate having screw-thread engagement with the shifter, a lever having an annular portion located between the main plate and the movable plate, friction rings on opposite faces of said annular portion, a stud secured in the end of said spindle, a spring abutment having threaded engagement with said stud, a main spring located between the abutment and the outer end of the shifter, and an actuating spring located between the abutment and the movable friction plate.

8. A shock absorber or spring retarder for vehicles, comprising a main plate having means for securing it to a vehicle frame member and also having a central spindle member, a shifter located on the spindle member, a pin passing through the spindle member and engaging in slots in the shifter to prevent rotation and permit axial movement of the latter, a movable friction plate having screw-thread engagement with the shifter, a lever having an annular portion located between the main plate and the movable plate, friction rings on opposite faces of said annular portion, a stud secured in the end of said spindle, a spring abutment having threaded engagement with said stud, a main spring located between the abutment and the outer end of the shifter, and an actuating spring located between the abutment and the movable friction plate, the shifter being provided with a shoulder to engage the movable friction plate and normally having a slight clearance therefrom.

9. A vehicle shock absorber or spring retarder, comprising a friction plate, a spindle member thereon, a shifter arranged for axial and non-rotative movement on the spindle member, a second friction plate having an inclined surface cooperating with a complemental surface of the shifter, a third friction member arranged for rotative movement between the first and second friction plates, a spring abutment secured to the spindle member, a pressure spring located between the abutment and the outer end of the shifter, a controlling spring acting on said second friction plate, and a centering device for the inner end of the pressure spring.

10. A shock absorber or spring retarder for vehicles, comprising a main plate, a spindle thereon, a shifter mounted for axial non-rotative movement on the spindle, a second friction plate having threaded engagement with the shifter, a pressure spring, a third friction member provided with friction rings located between the first and second plates, and a centering device for the inner end of the pressure spring.

11. A shock absorber or spring retarder for vehicles, comprising a main plate, a spindle thereon, a shifter mounted for axial non-rotative movement on the spindle, a second friction plate having threaded engagement with the shifter, a pressure spring, a third friction member provided with friction rings located between the first and second plates and having a lever arm, and a dished cover secured to one of the plates.

12. A shock absorber or spring retarder for vehicles, comprising a main plate, a spindle thereon, a shifter mounted for axial non-rotative movement on the spindle, a second friction plate having threaded engagement with the shifter, a pressure spring, a third friction member provided with friction rings located between the first and second plates and having a lever arm, and a dished cover secured to one of the plates and enclosing the springs and provided with a circular flange which has a rotative fit about the periphery of one of the friction rings, the main plate having a circular flange similarly cooperating with one of the friction rings.

13. In an appliance of the class described, a friction member adapted for connection to a vehicle part, another friction member arranged for relative rotation, a third relatively rotatable member adapted for connection to another vehicle part, a shifter arranged for axial movement, inclined members effective intermediate one of the members and the shifter and acting upon rotation of the member to move the shifter axially, and yieldable means for producing frictional pressure between the members, the pressure effect of said means being modified by shifter movement.

14. In an appliance of the class described, a friction member adapted for connection to a vehicle part, another friction member arranged for relative rotation, a third relatively rotatable member adapted for connection to another vehicle part, a shifter arranged for axial movement, inclined members effective intermediate one of the members and the shifter and acting upon rotation of the member to move the shifter axially, and yieldable means for urging the members to frictional engagement, the parts being arranged to make said yieldable means active and inactive for said purpose in different positions of the shifter.

15. In an appliance of the class described, a friction member adapted for connection to a vehicle part, another friction member arranged for relative rotation, a third relatively rotatable member adapted for connection to another vehicle part, a shifter arranged for axial movement, inclined members effective intermediate one of the members and the shifter and acting upon rotation of the member to move the shifter axially, yieldable means constantly tending to create friction between the members, and other yieldable means for creating friction pressure, the last named means being adapted in connection with other parts of the mechanism to produce frictional pressure in certain positions of the shifter and in other shifter positions to produce no effective pressure.

16. In an appliance of the class described, a friction member adapted for connection to a vehicle part, another friction member arranged for relative rotation, a third relatively rotatable member adapted for connection to another vehicle part, a shifter arranged for axial movement and restrained from rotation, inclined members effective intermediate one of the members and the shifter and acting upon rotatable means for producing frictional pressure between the members, the pressure effect of said means being modified by shifter movement.

17. In an appliance of the class described, a friction member adapted for connection to a vehicle part, another friction member arranged for relative rotation, a third relatively rotatable member adapted for connection to another vehicle part, a shifter arranged for axial movement, means preventing rotation of the shifter, inclined members effective intermediate one of the members and the shifter and acting upon rotation of the member to move the shifter axially and yieldable means for producing friction pressure between the members, the pressure effect of said means being modified by shifter movement.

18. A vehicle spring controlling appliance comprising a friction member adapted to be connected to a vehicle part, another relatively rotatable friction member, a third relatively rotatable member adapted to be connected to another vehicle part and frictionally gripped between the first two members, a supporting member extending substantially at the axis of rotation of the members, a shifter mounted for axial movement on the support and restrained from rotation, inclined members connecting the shifter with one of the friction members, and yieldable means for producing friction pressure between the members.

19. A vehicle spring controlling appliance comprising a friction member adapted to be connected to a vehicle part, another relatively rotatable friction member, a third relatively rotatable member adapted to be connected to another vehicle part and frictionally gripped between the first two members, a supporting member extending substantially at the axis of rotation of the members, a shifter mounted for axial movement on the support and restrained from rotation, inclined members connecting the shifter with one of the friction members, and yieldable means for producing friction pressure between the members, and arranged for modification of the pressure effect by the positioning of the shifter due to rotative movement of a friction member.

20. A vehicle spring controlling appliance comprising a main friction member adapted to be secured to a vehicle part, a spindle extending therefrom, a second friction member arranged for rotative movement in relation to the first, a third friction member arranged for rotative movement, frictionally gripped between the first two members and adapted to be connected to another vehicle part, a shifter arranged for axial movement on the spindle and restrained from rotative movement, screw threads connecting the shifter with one of the friction members, and yieldable means for creating frictional pressure between the members.

21. A vehicle spring controlling appliance comprising a main friction member adapted to be secured to a vehicle part, a spindle extending therefrom, a second friction member arranged for rotative movement in relation to the first, a third friction member arranged for rotative movement, frictionally gripped between the first two members and adapted to be connected to another vehicle part, a shifter arranged for axial movement on the spindle and restrained from rotative movement, screw threads connecting the shifter with one of the friction members, and yieldable means for creating frictional pressure between the members and arranged so that the effective pressure is modified by shifter movement.

22. A vehicle spring controlling appliance comprising a main friction member adapted to be secured to a vehicle part, a spindle extending therefrom, a second friction member arranged for rotative movement in relation to the first, a third friction member arranged for rotative movement, frictionally gripped between the first two members and adapted to be connected to another vehicle part, a shifter arranged for axial movement on the spindle and restrained from rotative movement, screw threads connecting the shifter with the second named friction member, and yieldable means for creating frictional pressure between the members.

23. A vehicle spring controlling appliance comprising a main friction member adapted to be secured to a vehicle part, a spindle extending therefrom, a second friction member arranged for rotative movement in relation to the first, a third friction member arranged for rotative movement, frictionally gripped between the first two members and adapted to be connected to another vehicle part, a shifter arranged for axial movement on the spindle and restrained from rotative movement, screw threads connecting the shifter with the second named friction member, and yieldable means for creating frictional pressure between the members and arranged so that the effective pressure is modified by shifter movement.

24. In an appliance of the class described, a friction member adapted for connection to a vehicle part, another friction member arranged for relative rotation, a third relatively rotatable member adapted for connection to another vehicle part, a shifter arranged for axial movement, inclined members effective intermediate one of the members and the shifter and acting upon rotation of the member to move the shifter axially, and yieldable means for producing frictional pressure between the members.

25. A vehicle spring controlling appliance, comprising relatively movable friction members, yieldable means for producing friction contact between said members, controlling means for said yieldable means, means normally retaining the yieldable means in inactive condition and providing for limited relatively free action of the controlling means, and means acting upon relative movement of certain of the friction members in one direction to move the controlling means through its free range and thereafter to bring said yieldable means in action to produce friction pressure between the friction members.

26. A vehicle spring controlling appliance, comprising relatively rotatable friction members, yieldable means for producing friction contact between said members, a controlling member for said yieldable means, means normally retaining the yieldable means in inactive condition and providing for limited relatively free movement of the controlling member, and means acting upon relative movement of certain of the friction members in one direction to move the controlling member through its free range and thereafter to bring said yieldable means in action to produce friction pressure between the friction members.

27. A vehicle spring controlling appliance, comprising a main friction member adapted to be connected to one of two relatively movable vehicle parts, such as the frame and axle, a relatively rotatable friction member, a third rotatable friction member frictionally held between the first and second members, a spring, a shifter arranged for actuation by the second named friction member and serving to make the spring effective to apply friction pressure to the members, clearance being provided to allow for a certain degree of relatively free movement of the shifter before it is effective to produce frictional application of the spring pressure.

28. A vehicle spring controlling appliance, comprising a main friction member adapted to be connected to one of two relatively movable vehicle parts, such as the frame and axle, a relatively rotatable friction member, a third rotatable friction member frictionally held between the first and second members, a spring, a shifter arranged for actuation by the second named friction member and serving to make the spring effective to apply friction pressure to the members, clearance being provided to allow for a certain degree of relatively free movement of the shifter before it is effective to produce frictional application of the spring pressure, and means acting to retain the spring in an inactive condition while the shifter is in operative relation to the spring.

29. A vehicle spring controlling appliance, comprising a main friction member adapted to be connected to one of two relatively movable vehicle parts, such as the frame and axle, a relatively rotatable friction member, a third rotatable friction member frictionally held between the first and second members, a spring, a shifter arranged for actuation by the second named friction member and serving to make the spring effective to apply friction pressure to the members, clearance being provided to allow for a certain degree of relatively free movement of the shifter before it is effective to produce frictional application of the spring pressure, and an additional spring tending constantly to produce frictional contact between the friction members.

30. A vehicle spring controlling appliance, comprising a main friction plate adapted to be connected to one of two relatively movable vehicle parts, such as the frame and axle, a relatively rotatable friction plate, a third rotatable friction plate frictionally held between the first and second plates, a spring, a shifter arranged for actuation by the second named friction plate and serving to make the spring effective to apply friction pressure to the plate, clearance being provided to allow for a certain degree of relatively free movement of the shifter before it is effective to produce frictional application of the spring pressure.

31. A vehicle spring controlling appliance, comprising a main friction plate adapted to be connected to a vehicle part, a spindle extending therefrom, a shifter arranged for longitudinal movement along the spindle axis and restrained from rotation, a second friction plate having screw-thread engagement with the shifter, a third friction plate arranged for rotation about the spindle axis and adapted to be connected to another vehicle part, and a spring normally stressed between an abutment and a seat and having a portion arranged in opposition to the shifter, with clearance providing a relatively free travel of the shifter before engagement with the spring.

32. A vehicle spring controlling appliance, comprising a main friction plate adapted to be connected to a vehicle part, a spindle extending therefrom, a shifter arranged for longitudinal movement along the spindle axis and restained from rotation, a second friction plate having screw-thread engagement with the shifter, a third friction plate arranged for rotation about the spindle axis and adapted to be connected to another vehicle part, and a spring normally stressed between an abutment and a seat and having a portion arranged in opposition to the shifter, with clearance providing a relatively free travel of the shifter before engagement with the spring, and another spring normally acting between an abutment and one of the friction plates to produce a practically constant friction effect.

33. An appliance of the class described comprising relatively fixed and movable friction members adapted for connection to parts of a vehicle such as the frame and axle to control action of the vehicle spring, a spring for applying friction pressure, means normally rendering the force of the spring inactive and self-contained, and means acting upon movement of one of the friction members to apply pressure of the spring to produce frictional contact of said members.

34. An appliance of the class described comprising a base adapted for connection to a vehicle part such as a frame member, a relatively oscillatory friction member, an outer rotary structure including a yieldable normally inactive pressure member and pressure applying means and an outer casing secured to said oscillatory member and enclosing and protecting the rotary structure.

Signed at New York in the county of New York and State of New York this 13th day of May, A. D. 1924.

RAYMOND P. LANSING.